United States Patent
Doumani (10) Patent No.: US 8,205,342 B2
(45) Date of Patent: Jun. 26, 2012

(54) ROTATING SPINDLE FOR A RECIPROCATING SAW

(75) Inventor: Robert Doumani, Hoffman Estates, IL (US)

(73) Assignee: Credo Technology Corporation, Broadview, IL (US)

( * ) Notice: Subject to any disclaimer, the term of this patent is extended or adjusted under 35 U.S.C. 154(b) by 551 days.

(21) Appl. No.: 12/343,385

(22) Filed: Dec. 23, 2008

(65) Prior Publication Data

US 2010/0154231 A1    Jun. 24, 2010

(51) Int. Cl.
B23D 49/16 (2006.01)
B23D 51/16 (2006.01)
B27B 19/09 (2006.01)

(52) U.S. Cl. ............ 30/394; 30/392; 83/699.21; 83/747

(58) Field of Classification Search ............ 30/381, 30/392, 393, 394, 520, 391; 173/170, 29; 144/35.1, 35.2; 83/13, 699.21, 747
See application file for complete search history.

(56) References Cited

U.S. PATENT DOCUMENTS

| | | | |
|---|---|---|---|
| 2,619,132 A * | 11/1952 | Pierce | 30/394 |
| 2,624,115 A * | 1/1953 | Gallagher et al. | 30/273 |
| 2,738,812 A * | 3/1956 | Waddell | 30/392 |
| 3,448,781 A * | 6/1969 | Angelucci | 30/392 |
| 3,494,390 A | 2/1970 | Dudek | |
| 3,665,983 A | 5/1972 | Wagner et al. | |
| 3,729,822 A | 5/1973 | Batson | |
| 3,876,015 A * | 4/1975 | Kivela | 173/170 |
| 4,283,855 A | 8/1981 | Nalley | |
| 4,528,753 A * | 7/1985 | Kuhlmann et al. | 30/392 |
| 4,693,009 A | 9/1987 | Bone | |
| 5,697,158 A * | 12/1997 | Klinzing et al. | 30/166.3 |
| 5,940,977 A * | 8/1999 | Moores, Jr. | 30/392 |
| 6,212,781 B1 | 4/2001 | Marinkovich et al. | |
| 6,508,151 B1 * | 1/2003 | Neitzell | 83/34 |
| 6,848,186 B1 | 2/2005 | Chen et al. | |
| 6,912,790 B2 * | 7/2005 | James et al. | 30/392 |
| 7,204,026 B2 | 4/2007 | Phillips et al. | |
| 7,251,896 B2 * | 8/2007 | Khubani | 30/199 |
| 7,325,315 B2 * | 2/2008 | Bigden et al. | 30/392 |
| 2003/0101600 A1 | 6/2003 | James et al. | |
| 2004/0016134 A1 | 1/2004 | Bednar et al. | |
| 2004/0148789 A1 | 8/2004 | Gist et al. | |
| 2005/0092156 A1 | 5/2005 | Michel et al. | |

* cited by examiner

*Primary Examiner* — Laura M. Lee
(74) *Attorney, Agent, or Firm* — Foley & Lardner LLP (57) ABSTRACT

A reciprocating saw including a first end, a working end opposite the first end, and a housing extending between the first end and the working end. A reciprocating shaft is supported within the housing and has a longitudinal axis. A locking mechanism is supported at the housing and is selectively moveable between a first position and a second position. When the locking mechanism is in the first position the reciprocating shaft is configured to substantially reciprocate relative to the housing but remain substantially rotationally fixed relative to the longitudinal axis of the reciprocating shaft. When the locking mechanism is in the second position, the reciprocating shaft is configured to substantially reciprocate relative to the housing and at the same time substantially rotate about the longitudinal axis of the reciprocating shaft independent of the housing.

12 Claims, 8 Drawing Sheets

ROTATING SPINDLE FOR A RECIPROCATING SAW

BACKGROUND

The application generally relates to a hand-held power tool and in particular to a reciprocating saw. More specifically, the application relates to a rotating spindle provided in a reciprocating saw.

A reciprocating saw is a power tool often used in the construction and home remodeling industries and may be used in a variety of cutting applications, including the cutting of wood, metal, plastics or any variety or combination of materials.

A typical reciprocating saw has a fixed blade attached to a shaft, specifically a reciprocating shaft that provides the saw with a reciprocating cutting motion. In order for a user of the reciprocating saw to change the cutting angle, the entire saw position must be changed. A system and/or method that allows a user to maximize the cutting reach of the saw and to more easily access confined and tight spaces is needed. A lightweight and ergonomically friendly reciprocating saw that is easy to change the position of the blade and/or to find a comfortable cutting position using the reciprocating saw is also needed.

A system and/or method that satisfies one or more of these needs or provides other advantageous features is desired. Other features and advantages will be made apparent from the present specification. The teachings disclosed extend to those embodiments that fall within the scope of the claims, regardless of whether they accomplish one or more of the aforementioned needs.

SUMMARY

A first embodiment of the innovation relates to a reciprocating saw including a first end, a working end opposite the first end, and a housing extending between the first end and the working end. A reciprocating shaft is supported within the housing and has a longitudinal axis. A locking mechanism is supported at the housing and is selectively moveable between a first position and a second position. When the locking mechanism is in the first position the reciprocating shaft is configured to substantially reciprocate relative to the housing but remain substantially rotationally fixed relative to the longitudinal axis of the reciprocating shaft. When the locking mechanism is in the second position, the reciprocating shaft is configured to substantially reciprocate relative to the housing and at the same time substantially rotate about the longitudinal axis of the reciprocating shaft independent of the housing.

Another embodiment of the innovation relates to a reciprocating saw including a housing and a reciprocating shaft supported within the housing. The reciprocating shaft has a longitudinal axis and a first end and a second end opposite the first end. A cutting blade is provided at the first end of the reciprocating shaft. A drive mechanism provided at a second end of the reciprocating shaft is configured to drive the reciprocating shaft in a substantially reciprocating motion relative to the housing while at the same time allowing the reciprocating shaft to substantially rotate about the longitudinal axis of the reciprocating shaft independent of the housing.

Another embodiment of the innovation relates to a method for allowing a scrolling cutting feature for a reciprocating saw. A housing is provided extending between a first end and a working end of the saw and a reciprocating shaft is provided and supported within the housing. The reciprocating shaft has a longitudinal axis and a first end provided at the working end of the saw and a second end opposite of the first end. A blade is provided at the first end of the reciprocating shaft. A driving mechanism is provided at the second end of the reciprocating shaft, the driving mechanism configured to drive the reciprocating shaft in a substantially reciprocating motion about the longitudinal axis of the reciprocating shaft relative the housing. A locking mechanism is provided and supported by the housing and selectively moveable between a first position and a second position. When the locking mechanism is in the first position the reciprocating shaft is configured to substantially reciprocate relative to the housing but remain substantially rotationally fixed relative to the longitudinal axis of the reciprocating shaft. When the locking mechanism is in the second position the reciprocating shaft is configured to substantially reciprocate relative to the housing and at the same time substantially rotate about the longitudinal axis of the reciprocating shaft independent of the housing.

Alternative exemplary embodiments relate to other features and combinations of features as may be generally recited in the claims.

BRIEF DESCRIPTION OF THE DRAWINGS

The application will become more fully understood from the following detailed description, taken in conjunction with the accompanying figures, wherein like reference numerals refer to like elements, in which:

FIG. 1b is another perspective view of the reciprocating saw shown in FIG. 1a.

FIG. 3a is another partial perspective view of the reciprocating saw shown in FIG. 1a.

DETAILED DESCRIPTION

Before turning to the figures which illustrate the exemplary embodiments in detail, it should be understood that the application is not limited to the details or methodology set forth in the following description or illustrated in the figures. It should also be understood that the terminology employed herein is for the purpose of description only and should not be regarded as limiting.

Figure 1A:
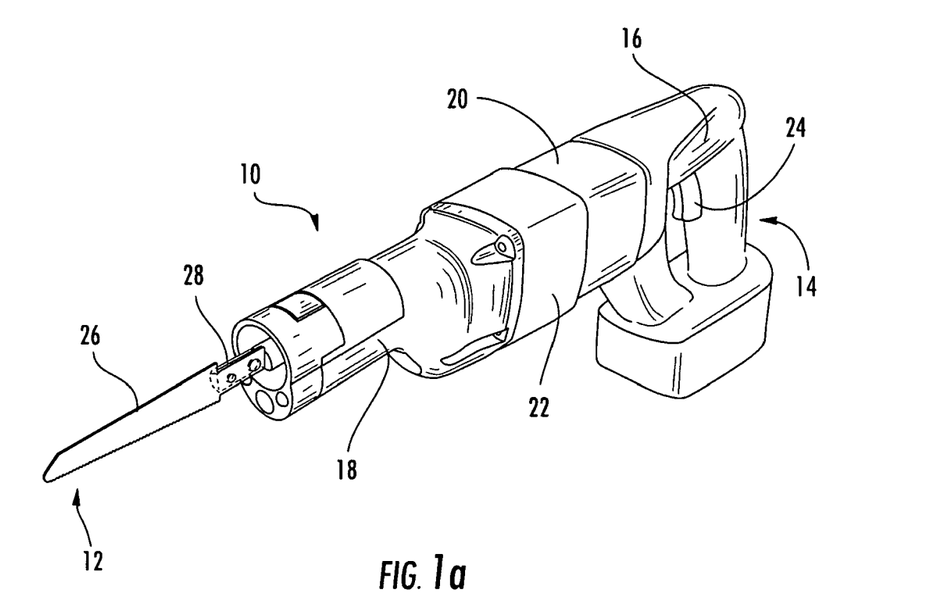
FIG. 1a is a perspective view of a reciprocating saw having a rotating spindle according an exemplary embodiment.
Figure 1B:
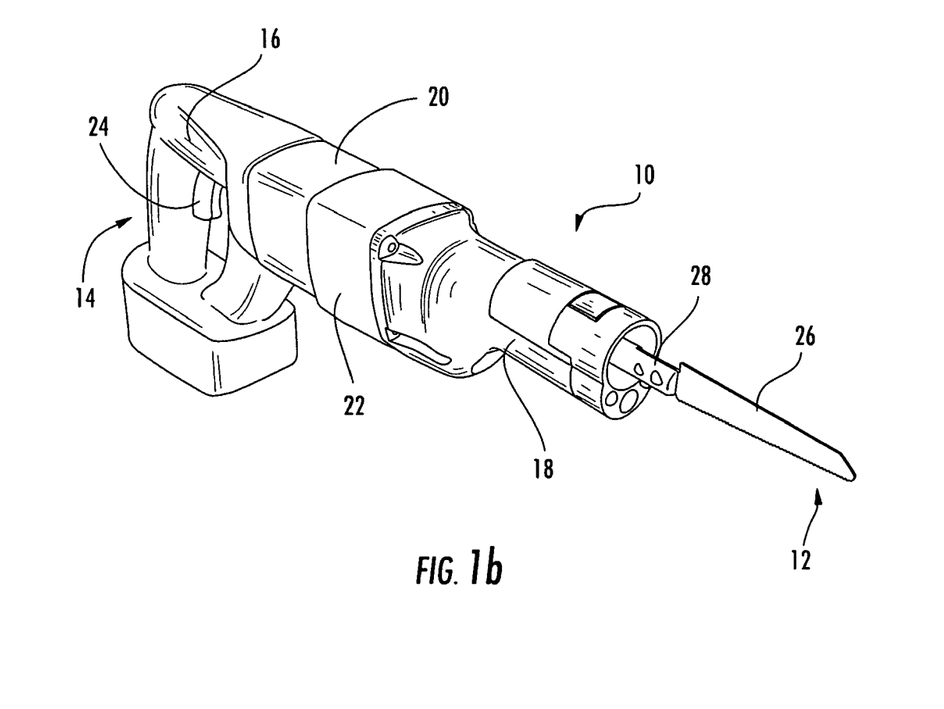
Figures 2A, 2B, 2C, 2D:
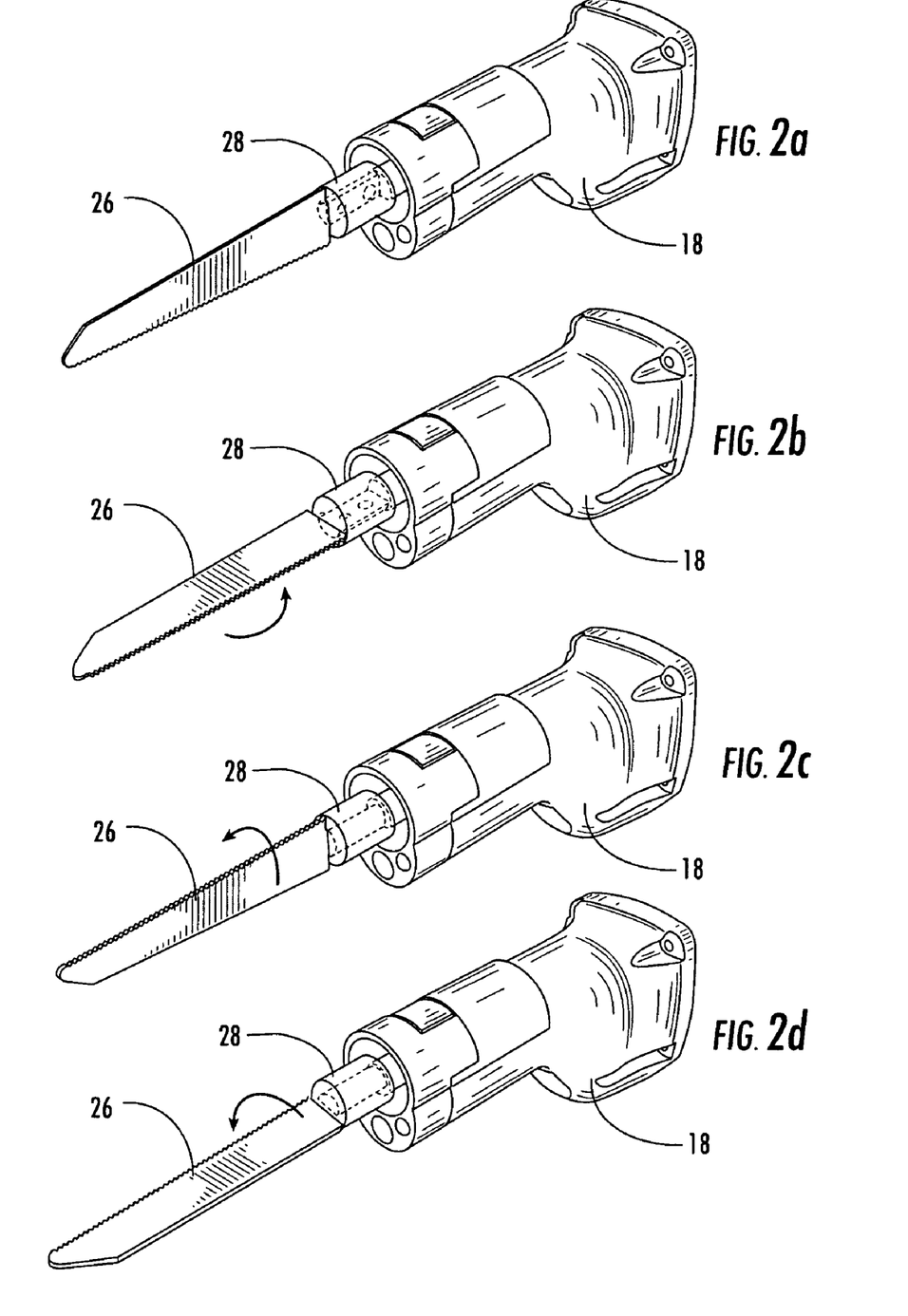
FIG. 2a is a partial perspective view of the reciprocating saw shown in FIG. 1a with the rotating spindle shown at a rotation position of 0°.
FIG. 2b is a partial perspective view of the reciprocating saw shown in FIG. 1a with the rotating spindle shown at a rotation position of 90°.
FIG. 2c is a partial perspective view of the reciprocating saw shown in FIG. 1a with the rotating spindle shown at a rotation position of 180°.
FIG. 2d is a partial perspective view of the reciprocating saw shown in FIG. 1a with the rotating spindle shown at a rotation position of 270°.

Referring to FIGS. 1a and 1b, a reciprocating saw 10 is shown according to an exemplary embodiment. The reciprocating saw 10 has a working end 12 and a non-working end 14 having a handle 16. A front housing 18 is located adjacent the working end 12 in between the working end 12 and the handle 16. A rear housing 20 is located adjacent the handle 16 in between the working end 12 and the handle 16. A middle housing, or bearing plate 22, is located in between the front housing 18 and the rear housing 20. A guide member or foot (not shown) may be provided at the working end 12 of the saw 10.

As shown in FIGS. 1a and 1b, the handle 16 may have a generally D-shaped configuration. According to other exemplary embodiments, the handle 16 may have different configurations. An on/off switch is preferably located on or near the handle 16 of the reciprocating saw 10. For instance, as shown in FIGS. 1a and 1b, a trigger switch 24 may be located on an interior surface of the handle 16. According to other exemplary embodiments, the on/off switch maybe located elsewhere on the handle 16 or elsewhere on the reciprocating saw 10. The saw 10 may be powered by a battery (that, for example, attaches to the handle) or the saw 10 may be plugged into a standard wall outlet.

Figure 3A:
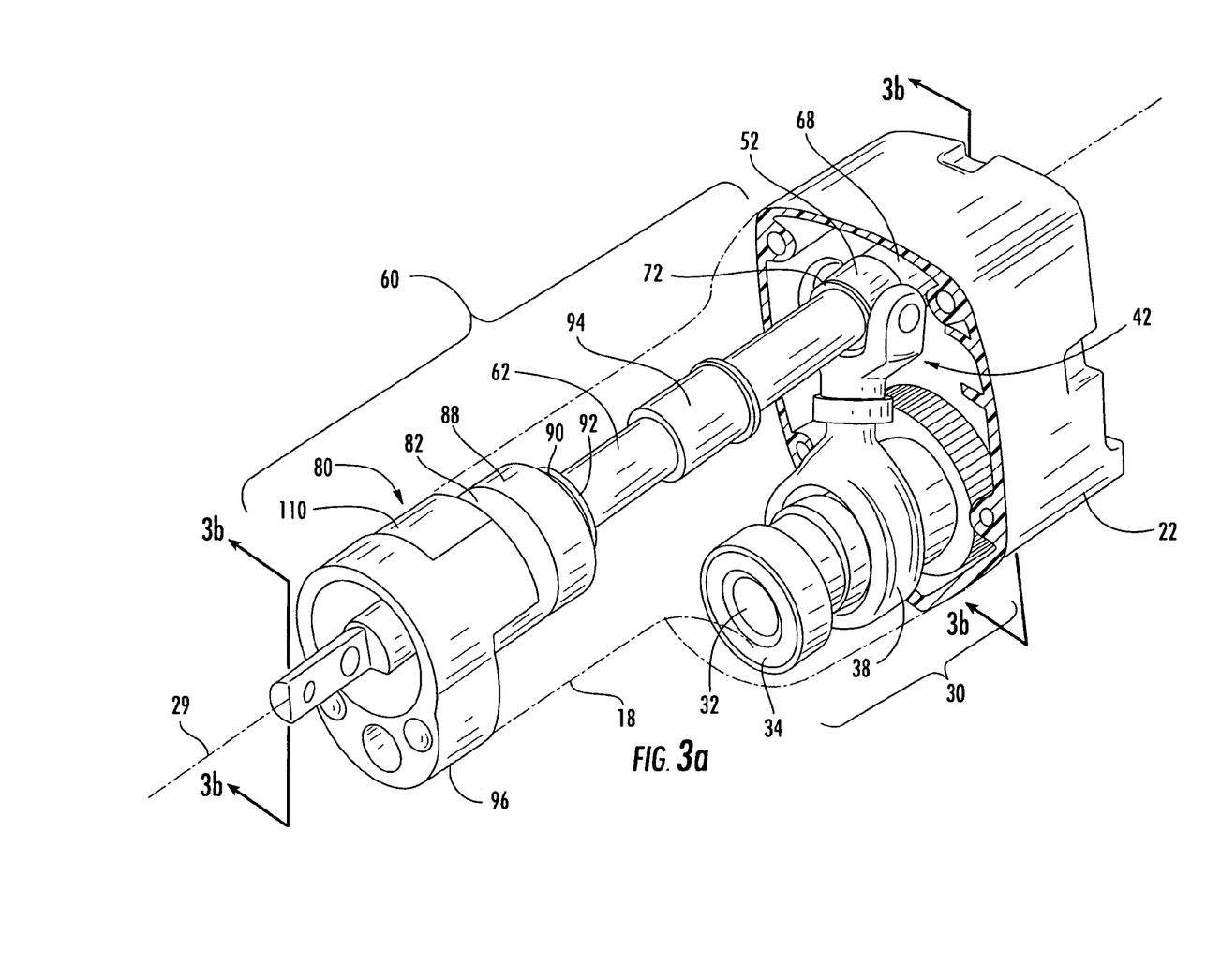
Figure 3B:
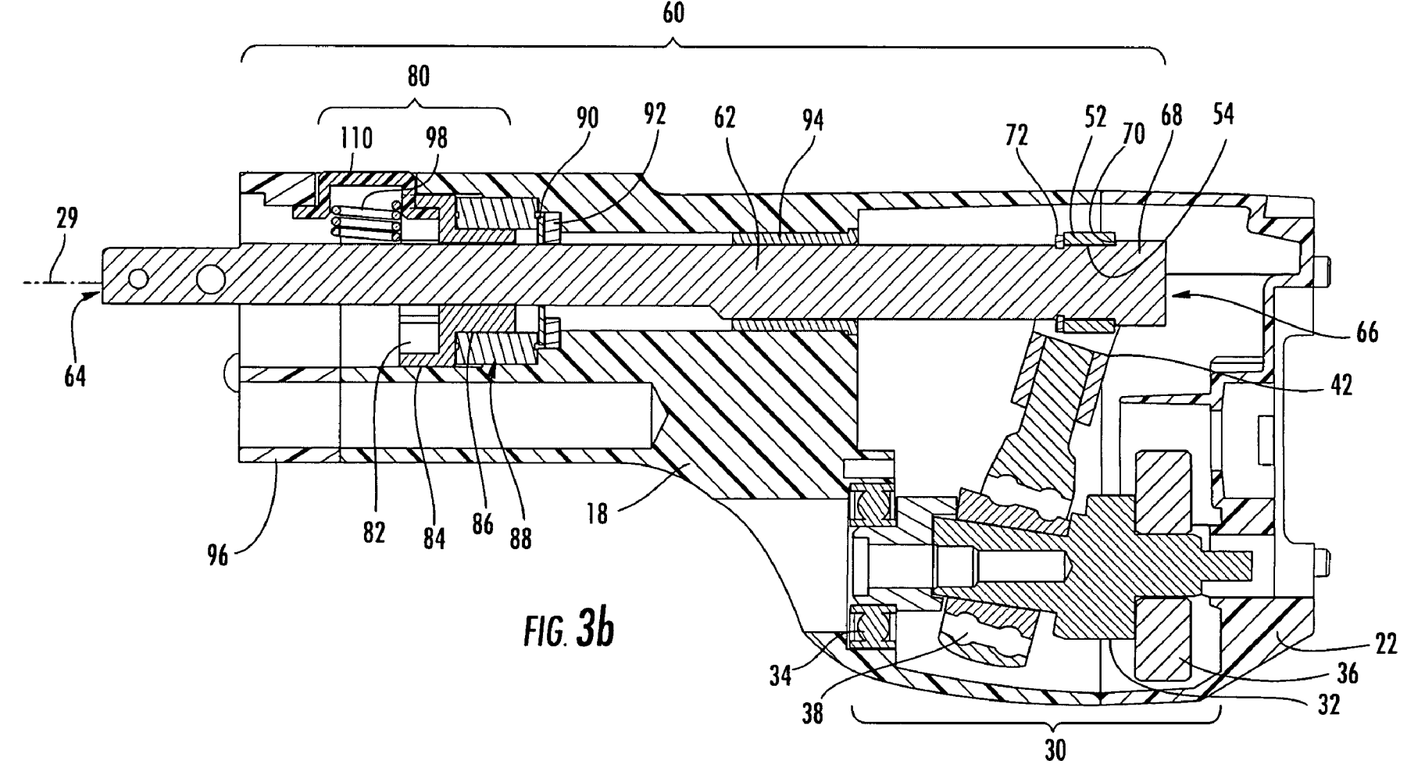
FIG. 3b is a cross-sectional view of the reciprocating saw shown in FIG. 3a taken along lines 3b-3b.
Figure 4:
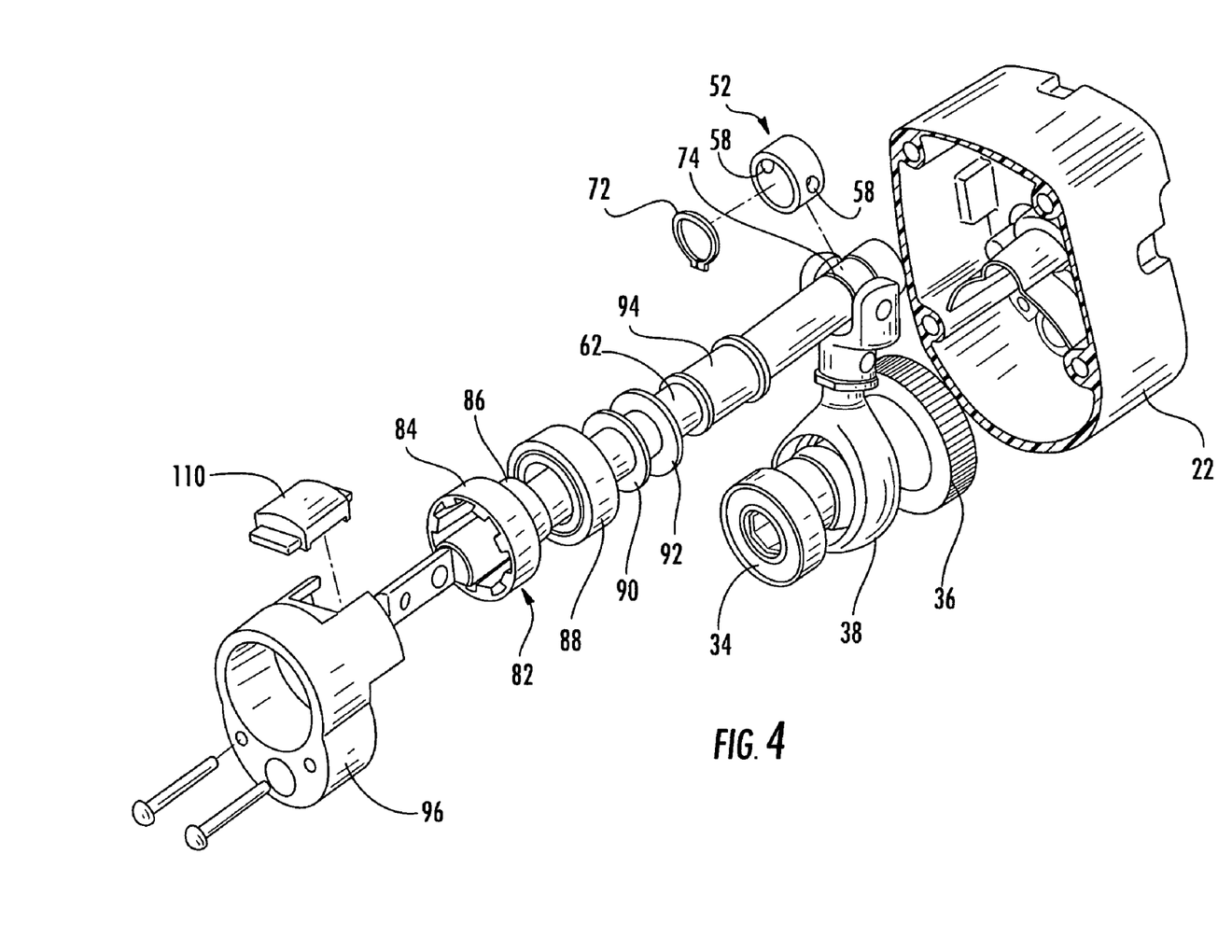
FIG. 4 is a partial exploded perspective view of the reciprocating saw shown in FIG. 3.

Referring to FIGS. 3a, 3b, and 4, the reciprocating saw 10 is shown to include a drive assembly 30 and a spindle assembly 60 according to an exemplary embodiment. As shown in the Figures, both the drive assembly 30 and the spindle assembly 60 are located in the front housing 18 between the working end 12 of the reciprocating saw 10 and the bearing plate 22 of the reciprocating saw 10. The drive assembly 30 in cooperation with the spindle assembly 60 converts rotary motion from a motor (not shown) to reciprocating motion for a saw blade 26. The spindle assembly 60 allows the blade 26 to rotate about the axis of the spindle independent of the front housing 18.

The drive assembly 30 includes a shaft shown as a drive shaft 32 having a first bearing 34 located at a first end of the drive shaft 32 and a second bearing (not shown) located at a second end of the drive shaft 32. The drive shaft 32 further includes a drive gear 36 located adjacent the second end of the drive shaft 32 which is matingly engaged with a pinion gear (not shown) that is coupled to the motor (not shown). Rotary motion of the motor is transmitted via the pinion gear to the drive gear 36, from the drive gear 36 to the drive shaft 32, and from the drive shaft 32 to a motion conversion device shown as a wobble 38. The rotary motion is converted to reciprocating motion via the internal configuration of the wobble 38 that is attached to an eccentric portion of the drive shaft 32.

Figure 5:
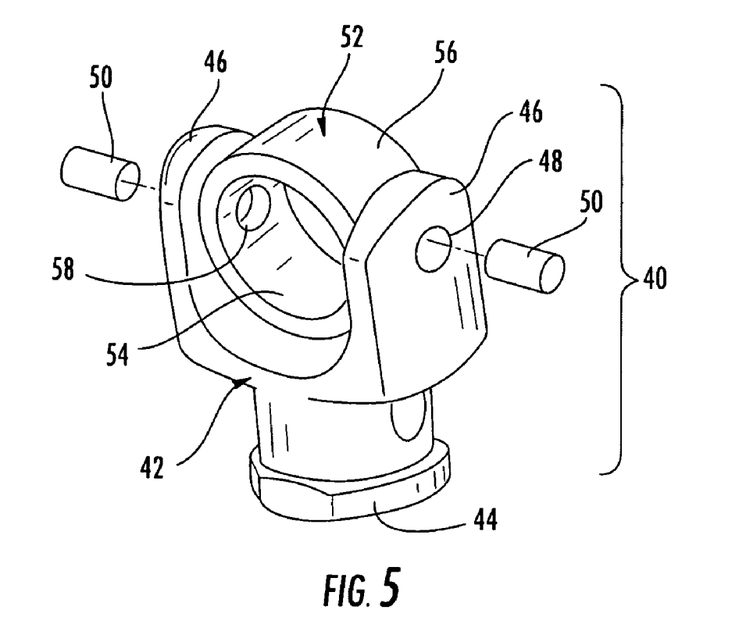
FIG. 5 is a perspective view of a drive mechanism for the reciprocating saw shown in FIG. 3.

Attached to an upper portion of the wobble 38 is a drive means or mechanism 40 (as shown in FIG. 5). The drive means or mechanism 40 is configured to transfer input reciprocating motion to a shaft in order to drive the shaft in a reciprocating motion. The drive means or mechanism 40 is also configured to allow the reciprocating shaft to rotate about the axis of the shaft while the shaft is reciprocating.

The drive means or mechanism 40 includes a drive fork 42 that is generally Y-shaped and includes a first end or portion 44 that is coupled to the upper portion of the wobble 38 and a first arm 46 extending from the first end 44 and a second arm 46 extending from the first end 44 spaced apart from the first arm 46. Each arm 46 contains an aperture 48 configured to receive a pin 50. Provided intermediate the two arms 46 is a drive bushing 52 which is generally a cylindrical shaped member having an internal diameter 54 configured to receive a shaft of the spindle assembly 60 and an external diameter 56 configured to be received in the arms 46 of the drive fork 42. The drive bushing 52 has multiple apertures 58 in the sides of the bushing 52 that are in alignment with the apertures in the arms 46 of the drive fork 42. The apertures 58 of the drive bushing 52 are configured to receive the pins 50 that are inserted through the apertures 58 of the drive fork 42. The pins 50 extend no further than the internal diameter 54 of the drive bushing 52 and do not contact or lock the shaft 32 to the drive bushing 52.

Referring to FIGS. 3a and 3b, the spindle assembly 60 is shown to include a spindle shaft 62 having a longitudinal axis 29 and also having a first end or working end 64 and a second end or driven end 66. One end of the spindle shaft 62 is shown received inside the drive bushing 52. A raised diameter portion 68 is provided at the second end 66 of the spindle shaft 62. When the spindle shaft 62 is inserted in the drive bushing 52, a shoulder or edge 70 of the raised diameter portion 68 of the spindle shaft 62 contacts one side of the drive bushing 52 and couples lateral movement of the drive mechanism 40 to the spindle shaft 62 in a first direction or rearward direction. A member shown as a retaining clip 72 is provided (e.g., in a groove 74) on the opposite side of the drive bushing 52 to couple lateral movement of the drive mechanism 40 to the spindle shaft 62 in a second direction or forward direction.

In an alternative embodiment, the drive bushing 52 may be laterally coupled to the spindle shaft 62 by two members or retaining clips 72 (e.g., one retaining clip 72 on each side of the drive bushing 52). In yet another alternative embodiment, the raised diameter portion 68 of the spindle shaft 62 may be reversed with the member or retaining clip 72 (e.g., the raised portion 68 restrains the front side of the drive bushing 52 and the retaining clip 72 restrains the rear side of the drive bushing 52).

In operation, as the wobble 38 converts rotary motion of the drive shaft 32 to reciprocating motion, the drive fork 42 transmits the reciprocating motion to the drive bushing 52. The drive bushing 52 cooperates with the spindle shaft 62 to reciprocate with respect to the front housing 18. However, as mentioned above, the pins 50 that couple the drive bushing 52 to the drive fork 42 do not extend sufficiently beyond to the inside diameter 54 of the drive bushing 52 to make contact with the spindle shaft 62. Therefore, the spindle shaft 62 is rotationally free within the drive bushing 52 and the spindle shaft 62 is able to rotate inside the drive bushing 52.

Referring to FIGS. 3a, 3b, and 4, the spindle assembly 60 is shown to include a locking means or assembly 80. The locking assembly 80 is configured to selectively lock and unlock the spindle assembly 60 in a rotational manner, thereby allowing the spindle assembly 60 to rotate substantially about the longitudinal axis 29 of the spindle shaft 62 independent of the front housing 18. For example, when the locking assembly 80 is locked, the spindle assembly 60 is able to reciprocate substantially along the longitudinal axis 29, but remains substantially fixed rotationally with respect to the longitudinal axis 29 of the spindle shaft 62. When the locking assembly 80 is unlocked, the spindle assembly 60 is able to reciprocate substantially along and rotate substantially about the longitudinal axis 29 of the spindle shaft 62.

The spindle assembly 60 also includes a dust retention device shown as a steel washer 90 and a felt washer 92 located on the spindle shaft 62 in between the working end 64 and the driven end 66 of the spindle shaft 62. These washers aid in preventing dust and debris from entering the interior of the front housing 18. In alternative embodiments, the dust retention device may be other suitable devices and/or may be located elsewhere on the reciprocating saw.

The spindle assembly 60 further includes a second bushing shown as a back spindle bushing 94 to aid in the support of the spindle shaft 62 during the substantially reciprocating motion and the substantially rotary motion of the shaft 62. The back spindle bushing 94 is received by the front housing 18 (e.g., pressed into the front housing) and remains in a fixed position with respect to the spindle shaft 62 reciprocating back and forth through the interior diameter of the back spindle bushing 94. The back spindle bushing 94 also remains in a fixed position with respect to the spindle shaft 62 rotating in the interior diameter of the back spindle bushing 94.

Still referring to FIGS. 3a, 3b, and 4, the locking assembly 80 is shown to include a locking bushing 82 that is provided adjacent the first end 64 of the spindle shaft 62. The locking bushing 82 has a first external diameter 84 configured to be received inside the front housing 18 and a second external diameter 86 configured to cooperate with a bearing 88. In one exemplary embodiment, the bearing 88 is a thin wall bearing. The bearing 88 is pressed onto the second external diameter 86 of the locking bushing 82. The bearing 88 is then pressed into the front housing 18. The first external diameter 84 of the locking bushing 82 is configured to be slightly smaller than the external diameter of the bearing 88 so that when the bearing 88 is pressed into the front housing 18, there is a predetermined amount of clearance between the first external diameter 84 of the locking bushing 82 and the front housing 18 as shown in FIG. 3b.

Figure 6:
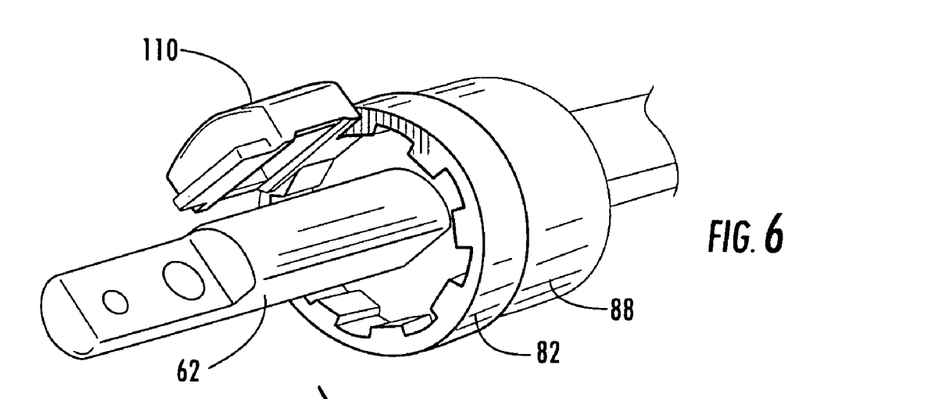
FIG. 6 is a perspective view of a locking assembly shown in a locked position for the reciprocating saw shown in FIG. 3.
Figure 7:
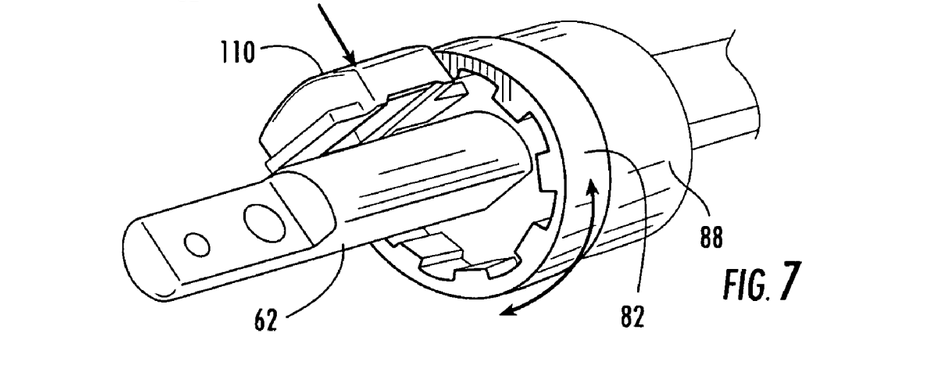
FIG. 7 is a perspective view of a locking assembly shown in an unlocked position for the reciprocating saw shown in FIG. 3.
Figure 8:
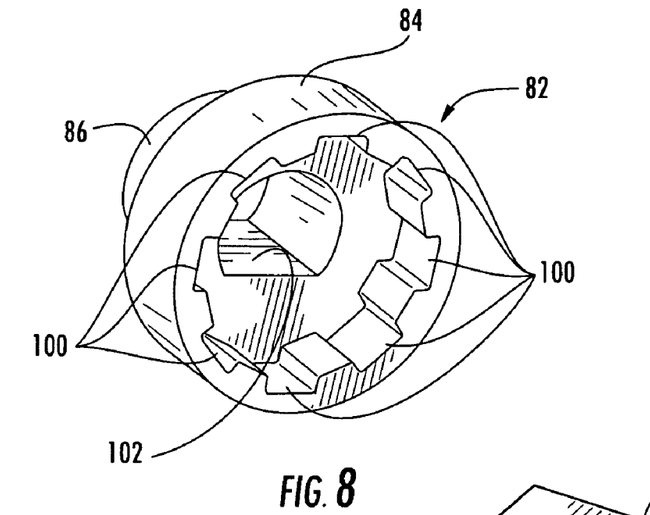
FIG. 8 is a perspective view of a locking bushing for the reciprocating saw shown in FIG. 3.

Referring to FIGS. 6-8, the locking bushing 82 is shown to have an internal diameter 102 configured to be slidably coupled with the spindle shaft 62. The internal diameter 102 is configured so that the spindle shaft 62 may reciprocate through the locking bushing 82 independent of the locking bushing 82. In addition, the internal diameter 102 includes a flat portion that corresponds to a flat portion of the spindle shaft 62 so that the locking bushing 82 and the spindle shaft 62 are rotationally coupled to one another relative to the longitudinal axis 29 of the spindle shaft 62. Thus, when the locking bushing 82 rotates, so does the spindle shaft 62 and vice versa. In an alternative embodiment, the locking bushing 82 and the spindle shaft 62 may be rotationally coupled by a keyway, a spline, a tongue and groove configuration, or other appropriate configuration.

Referring to FIGS. 3-4 and 6-7, the locking assembly 80 also includes a locking mechanism (device, member, slider, switch, etc.) shown as a locking button 110. The locking button 110 is received and retained by the front housing cover 96 but may be located elsewhere. The locking button 110 is selectively engaged with the locking bushing 82. As shown in FIG. 6, the locking button 110 is shown in a first position which substantially fixes the rotational position of the spindle assembly 60 with respect to the front housing 18 but still allows the spindle shaft 62 to reciprocate with respect to the front housing 18. In the first position, the locking button 110 is engaged with the locking bushing 82.

Referring to FIG. 7, by depressing the locking button 110 (i.e., pressing the locking button radially inward relative to the spindle shaft 62), the locking button 110 is moved to a second position and disengaged from the locking bushing 82. Once the locking button 110 is disengaged from the locking bushing 82, the spindle shaft 62 is free to rotate about the longitudinal axis 29 of the spindle shaft 62 for a full 360° independent of the front housing 18. The locking button 110 may be disengaged or moved to the second position both while the reciprocating saw 10 is running (i.e., while the spindle shaft 62 is reciprocating) or when the reciprocating saw 10 is off.

The locking assembly 80 preferably includes a biasing device shown as a spring 98 to bias the locking button 110 in a locked or engaged position. In addition, the locking button 110 may be configured to be biased or retained in the second or unlocked position. Biasing or retaining the locking button 110 in an unlocked position allows for free rotation of the spindle shaft 62 of a full 360°. The free rotation setting of the spindle shaft 62 allows for scroll cutting (scrolling) while using the reciprocating saw 10.

Figure 11:
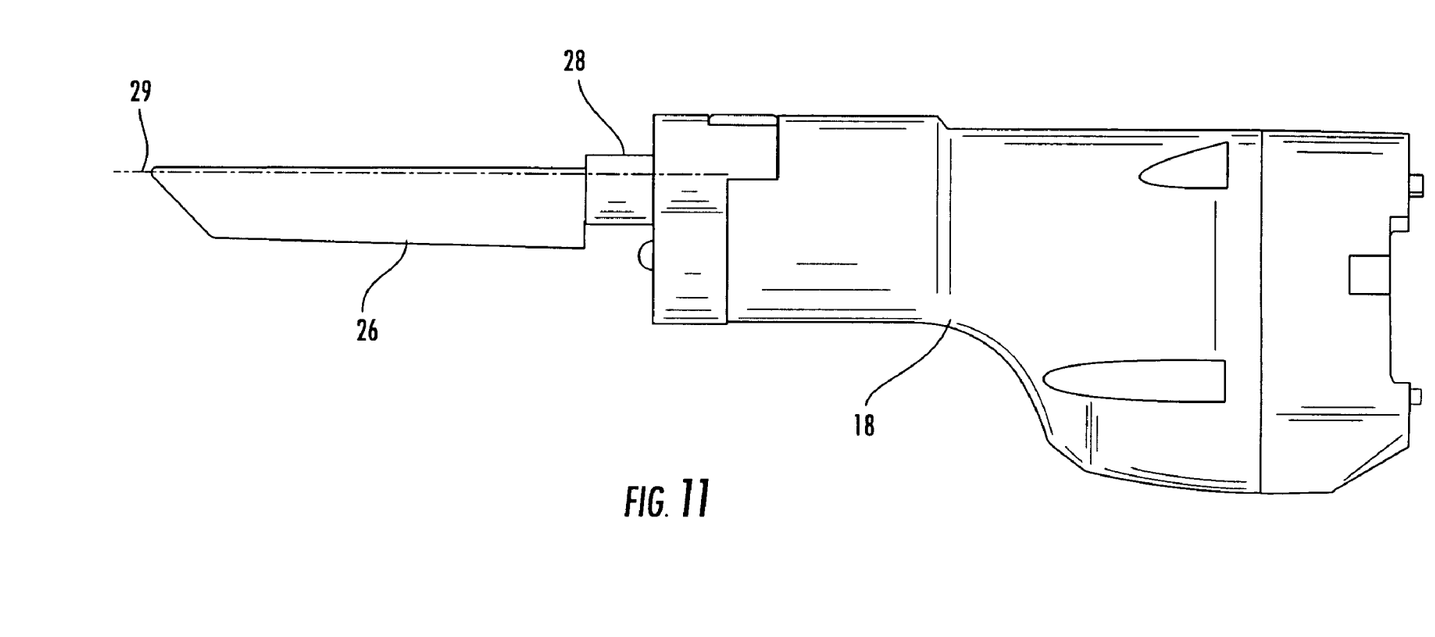
FIG. 11 is a side view of the reciprocating saw shown according to another exemplary embodiment.

Referring to FIG. 11, the cutting edge of the blade 26 is shown off center from the longitudinal axis 29 of the spindle shaft 62 according to an exemplary embodiment. The blade 26 is coupled to the spindle shaft 62 by a blade clamp or blade holder 28. The blade holder 28 may be a manual blade holder or a keyless blade holder as is known in the art. Locating the cutting edge of the blade 26 off center from the longitudinal axis 29 creates a moment arm between the blade and the spindle shaft 62. When the saw 10 is in the free rotation setting, the moment arm keeps the blade 26 going in the direction of a force applied by a user, allowing hands free scrolling.

Referring to FIGS. 6-8, the locking bushing 82 has multiple locking positions 100 (e.g., slots, detents, splines, etc.) formed therein in which the locking button 110 may engage. These locking positions 100 may be equally spaced about the radial axis of the locking bushing 82. As shown in FIGS. 6-8, the depicted embodiment of the locking bushing 82 has eight (8) locking positions 100 that are located at every 45° (e.g., 0°, 45°, 90°, 135°, 180°, etc.) about the radial axis of the locking bushing 82. In another exemplary embodiment, the locking bushing 82 may have four (4) locking positions 100, such as shown in FIGS. 2a-2d, where the reciprocating saw 10 is shown with the rotating spindle shown in various positions of rotation (e.g., 0°, 90°, 180°, 270°). In other exemplary embodiments, the locking bushing 82 may have more or less locking positions 100 that may or may not be equally spaced about the radial axis.

Figure 9:
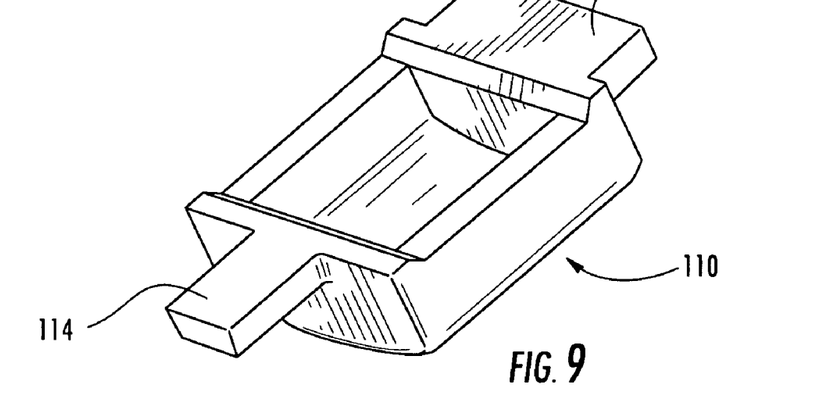
FIG. 9 is a perspective view of a locking mechanism for the reciprocating saw shown in FIG. 3.
Figure 10:
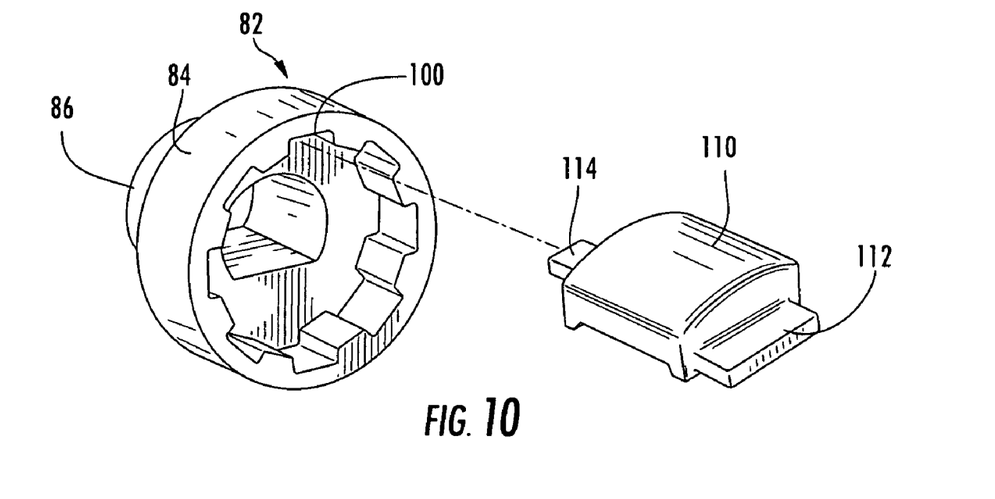
FIG. 10 is an exploded perspective view of the locking assembly for the reciprocating saw shown in FIG. 3.

Referring to FIG. 9, the locking button 110 includes a first projection 112 extending from a first end of the button 110 and a second projection 114 extending from a second end of the button 110. The first projection 112 is configured to be received by the front housing cover 96 and the second projection 114 is configured to be selectively engaged with the various locking positions 100 of the locking bushing 82. As shown in the Figures, the locking button 110 is pressed radially inward relative to the shaft 62 to disengage the locking button 110 from the locking bushing 82. In an alternative embodiment, the locking button 110 may be configured to slide relative to the locking bushing 82 (and the front housing cover 96) to engage/disengage with the locking bushing 82.

The advantages of the reciprocating saw 10 shown and described in the present application include allowing a user of the saw 10 to more easily access confined and tight spaces with the reciprocating saw 10. The rotating spindle 60 of the reciprocating saw 10 allows a user to find the best rotational position for the blade 26 relative to the workpiece being cut without having to flip or turn the blade 26 over or make multiple cuts with the saw 10. The rotating spindle 60 also allows the user to change hand positions in the middle of a cut and to maximize the cutting reach in tight areas. The design also allows for an ergonomically friendly design that is both low weight and has a low power/low torque requirement. The free scrolling cutting feature also allows hands free scrolling using the reciprocating saw 10.

For the purpose of this disclosure, the terms "coupled," "connected," and the like mean the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any process or method steps may be varied or re-sequenced according to alternative embodiments.

It is important to note that the construction and arrangement of the rotating spindle for a reciprocating saw as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Additionally, the components of the reciprocating saw may be constructed from any suitable and appropriate materials such as powdered metal, investment cast steel, metal injection molding (MIM), polymers, etc. Accordingly, all such modifications are intended to be included within the scope of the present application. Other substitutions, modifications, changes and omissions may be made in the design, operating conditions and arrangement of the exemplary embodiments without departing from the scope of the present application.

What is claimed is:

1. A reciprocating saw, comprising:
    a first end;
    a working end opposite the first end;
    a housing extending between the first end and the working end;
    a reciprocating shaft supported within the housing, the reciprocating shaft extending between the first end and the working end of the saw and having a longitudinal axis; and
    a locking mechanism supported by the housing at the working end of the saw, the locking mechanism selectively moveable between a first position and a second position;
    wherein when the locking mechanism is in the first position the reciprocating shaft is configured to substantially reciprocate relative to the housing but remain substantially rotationally fixed relative to the longitudinal axis of the reciprocating shaft; and
    wherein when the locking mechanism is in the second position the reciprocating shaft is configured to substantially reciprocate relative to the housing and at the same time substantially rotate about the longitudinal axis of the reciprocating shaft independent of the housing.

2. The reciprocating saw of claim 1, further comprising a blade holder coupled to a first end of the reciprocating shaft and configured to support a cutting blade, wherein the first end of the reciprocating shaft is provided at the working end of the saw.

3. The reciprocating saw of claim 1, further comprising a locking bushing provided at the working end of the saw, the locking bushing being engaged with the locking mechanism in the first position and disengaged with the locking mechanism in the second position.

4. The reciprocating saw of claim 3, wherein the locking bushing has an internal surface that is configured to be slidably engaged with the reciprocating shaft, wherein when the locking mechanism is in the first position the reciprocating shaft is configured to substantially reciprocate relative to the internal surface of the locking bushing, and wherein when the locking mechanism is in the second position the reciprocating shaft is configured to substantially reciprocate relative to the internal surface of the locking bushing and substantially rotate about the longitudinal axis of the reciprocating shaft independent of the housing.

5. The reciprocating saw of claim 4, wherein the locking bushing comprises a plurality of locking positions.

6. The reciprocating saw of claim 5, wherein the locking bushing comprises four locking positions, wherein the four locking positions are located at 0°, 90°, 180°, and 270° with respect to the longitudinal axis of the reciprocating shaft.

7. The reciprocating saw of claim 5, wherein the locking bushing comprises eight locking positions.

8. The reciprocating saw of claim 2, wherein the locking mechanism is retained in the second position to allow free rotation of the reciprocating shaft independent of the housing.

9. The reciprocating saw of claim 8, wherein the cutting blade is located off center from the longitudinal axis of the reciprocating shaft to create a moment arm that keeps the cutting blade going in a direction of an applied force to allow for hands free scroll cutting while the locking mechanism is in the second position.

10. The reciprocating saw of claim 1, further comprising a drive bushing provided at a second end of the reciprocating shaft, the drive bushing configured to provide reciprocating motion to the reciprocating shaft when driven by a drive device and wherein the drive bushing is also configured to allow substantially free rotation of the reciprocating shaft about an internal diameter of the drive bushing when the locking mechanism is in the second position.

11. The reciprocating saw of claim 10, wherein the drive device is a drive fork having a first arm and a second arm configured to receive the drive bushing.

12. The reciprocating saw of claim 11, wherein the drive fork is coupled to the drive bushing via a plurality of pins.

* * * * *